UNITED STATES PATENT OFFICE.

HEINZ EICHWEDE, OF UNTERLIEDERBACH, NEAR HÖCHST-ON-THE-MAIN, GERMANY, ASSIGNOR TO FARBWERKE VORM. MEISTER LUCIUS & BRUNING, OF HÖCHST-ON-THE-MAIN, GERMANY, A CORPORATION OF GERMANY.

BLUE MONOAZO DYES AND PROCESS OF MAKING SAME.

1,188,421.  Specification of Letters Patent.  Patented June 27, 1916.

No Drawing.   Application filed April 9, 1915.   Serial No. 20,301.

*To all whom it may concern:*

Be it known that I, HEINZ EICHWEDE, Ph. D., chemist, a citizen of the Empire of Germany, residing at Unterliederbach, near Höchst-on-the-Main, Germany, have invented certain new and useful Improvements in Blue Monoazo Dyes and Processes of Making Same, of which the following is a specification.

I have found that fast blue wool dyestuffs are obtained possessing the valuable property of giving perfect dyeings on wool even in a neutral bath, by combining the diazo compounds of 1-amino-8-naphtholmonosulfonic acids with aryl-1-naphthylamin-8-sulfonic acids.

The following example illustrates my invention: 23.9 kg. of 1-amino-8-naphthol-4-sulfonic acid are diazotized with 25 kg. of hydrochloric acid of 20° Bé. and 7 kg. of nitrite. The yellowish-brown diazo compound which separates is introduced into a solution of 32.1 kg. of the sodium salt of phenyl-1-naphthylamin-8-sulfonic acid and there is then added sodium acetate or sodium carbonate until the acid reaction has disappeared. After having heated the whole for a short time, the coloring matter is separated from the solution rendered alkaline. The dyestuff thus obtained forms, when dry, a violet-black powder and dyes wool, both in a slightly acid bath and in a neutral bath a pure blue tint of excellent fastness to washing, milling, rubbing and to the light.

If tolyl-1-naphthylamin-8-sulfonic acid is used, a blue tint with a somewhat more greenish hue but of equal purity and fastness is obtained; when using 1-amino-8-naphthol-5-sulfonic acid instead of 1-amino-8-naphthol-4-sulfonic acid, more reddish tints of same purity and fastness are produced.

Having now described my invention, what I claim is:

1. The process of manufacturing blue monoazo dyestuffs, which consists in combining the diazo compounds of a 1-amino-8-naphtholmonosulfonic acid with an aryl-1-naphthylamin-8-sulfonic acid.

2. The process of manufacturing a blue monoazo dyestuff which consists in combining the diazo compound of the 1-amino-8-naphthol-4-sulfonic acid with the phenyl-1-naphthylamin-8-sulfonic acid.

3. As new articles of manufacture, the dyestuffs, the radicals of which have the formula:

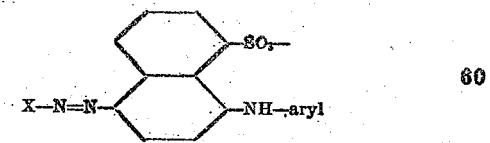

wherein X stands for the residue of a naphthol-monosulfonic acid the hydroxyl group of which stands in 8 position to the diazo group; which dyestuffs are, when dry, in the form of sodium salts violet-black powders, readily soluble in water, dyeing wool in a slight acid or in a neutral bath pure blue tints of great fastness to washing and milling as well as to rubbing and to the light.

4. As a new article of manufacture, the dyestuff of the formula:

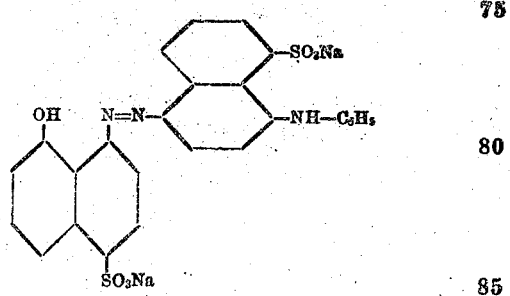

which dyestuff is, when dry, a violet-black powder, readily soluble in water, dyeing wool in a slightly acid or in a neutral bath pure blue tints of great fastness to washing and milling as well as to rubbing and to the light.

In testimony whereof I affix my signature in presence of two witnesses.

HEINZ EICHWEDE.

Witnesses:
 JEAN GRUND,
 CARL GRUND.